United States Patent

Usami et al.

[11] Patent Number: 6,076,149
[45] Date of Patent: Jun. 13, 2000

[54] PROGRAMMABLE LOGIC DEVICE USING A TWO BIT SECURITY SCHEME TO PREVENT UNAUTHORIZED ACCESS

[75] Inventors: Tadashi Usami, Hino; Hideki Kondo, Tokyo; Shigeki Kamio, Kunitachi, all of Japan

[73] Assignee: Motorola, Inc., Schaumburg, Ill.

[21] Appl. No.: 09/009,346

[22] Filed: Jan. 20, 1998

[30] Foreign Application Priority Data

Feb. 14, 1997 [JP] Japan ................................. 9-047091

[51] Int. Cl.$^7$ ............................ G06F 12/14; H04L 9/00
[52] U.S. Cl. ............................ 711/163; 711/103; 711/152; 711/170; 326/8; 713/200
[58] Field of Search ................................. 711/103, 166, 711/163, 164, 152, 170; 712/37; 380/3, 4; 365/185.04; 326/8; 713/200, 202; 710/36

[56] References Cited

U.S. PATENT DOCUMENTS

| | | | |
|---|---|---|---|
| 4,590,552 | 5/1986 | Guttag et al. | 711/163 |
| 4,698,750 | 10/1987 | Wilkie et al. | 711/166 |
| 5,293,610 | 3/1994 | Schwarz | 711/164 |
| 5,313,520 | 5/1994 | Han | 380/4 |
| 5,349,249 | 9/1994 | Chiang et al. | 380/4 |
| 5,557,743 | 9/1996 | Pombo et al. | 713/200 |
| 5,826,007 | 10/1998 | Sakaki et al. | 714/42 |

*Primary Examiner*—Eddie P. Chan
*Assistant Examiner*—Yamir Encarnacion
*Attorney, Agent, or Firm*—Miriam Jackson

[57] ABSTRACT

For a data processing device having a main memory comprised of a non-volatile memory and a CPU, memory protection and security are ensured for its programs and so forth. An auxiliary memory for storing security bit data is provided, for example, in an EPROM that comprises the main memory. Assuming that the result read by the CPU is "0" when a current flows between a drain and a source of a transistor in the EPROM, and "1" when the current does not flow, then the security bit data read from two transistors A and B are A=1 and B=1, which means they are set so that access to the main memory and a write to the auxiliary memory are prohibited. With A=0 and B=0, security is set, but a write to the auxiliary memory is permitted; with A=1 (0) and B=0 (1), security is reset.

3 Claims, 6 Drawing Sheets

| READ RESULT | PROCESSING STATUS | FLOATING GATE |
|---|---|---|
| 0 | ERASURE BY ULTRAVIOLET | NO NEGATIVE-CHARGE ACCUMULATION |
| 1 | PROGRAMMING | NEGATIVE-CHARGE ACCUMULATION |

*FIG.8*

| READ RESULT | | SECURITY STATUS |
|---|---|---|
| A | B | |
| 0 | 0 | SET |
| 0 | 1 | RESET |
| 1 | 0 | RESET |
| 1 | 1 | SET |

*FIG.9*

PROGRAMMABLE LOGIC DEVICE USING A TWO BIT SECURITY SCHEME TO PREVENT UNAUTHORIZED ACCESS

FIELD OF THE INVENTION

The present invention relates to a data storage device having a memory and a processing portion, and more specifically to a device that can provide memory protection and security for a memory contained, for example, in a single-chip controller unit, or that can prevent any functional test program performed before shipment from being activated by the user.

BACKGROUND OF THE INVENTION

Generally, with a single-chip microcontroller having a ROM (Read-Only Memory) and a CPU (Central Processing Unit), it is necessary to prevent the data stored in the ROM, for example, game software or management information, from being read by a third party and to prevent the data in the ROM from being rewritten or overwritten externally by a hacker.

During the stages of program development, because an external ROM is connected to the chip and the data is read from the ROM in the chip in order to modify the program contained therein, an input/output port must be enabled so that signals over address and data buses can be transferred externally. Conversely, after the program development is completed, it is necessary to disable any external connection to the data and address buses in the input/output port and set their security. "Setting security" herein means protecting the contents of the ROM (protection against external overwriting of the data) and keeping them confidential or secure (protection against external reading of the data).

To do so, a known conventional method is to set a security bit in a register, and disable the operation of the input/output port when this bit is set, and enter a password when the security is to be reset or cleared, or input a predetermined combination of logic signals to an external terminal. However, this method is rendered meaningless if the password or combination of signals is known to a third party, and such a password or combination may possibly be discovered if it is traced.

Figure 5:
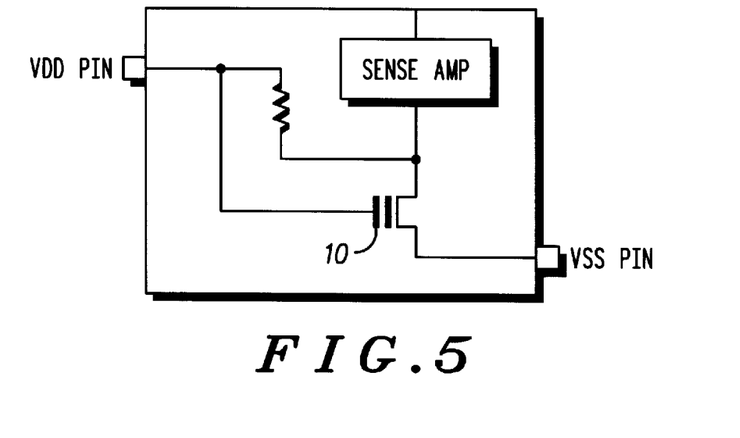
FIG. 5 is a circuit diagram depicting a comparative example for setting the security.

Accordingly, the inventor directed its attention to an EPROM (Erasable Programmable ROM) as a storage portion for writing security bit data therein (hereinafter referred to as an "auxiliary storage portion). For example, assuming that a transistor, which is a single floating-gate memory cell of the EPROM, is used to write security bit data, then one power supply terminal (Vdd) and the other terminal (Vss) are connected to a gate and a source of a transistor 10, respectively, as shown in FIG. 5, and a high voltage is applied to the gate of the transistor 10 to store charge on the floating gate. Now, assuming that the read result is defined as "1", then the CPU first reads the security bit data even when the CPU is activated by a third party; because the result is "1", external connection of the data and address buses in the input/output port is disabled or prohibited.

Figure 6:
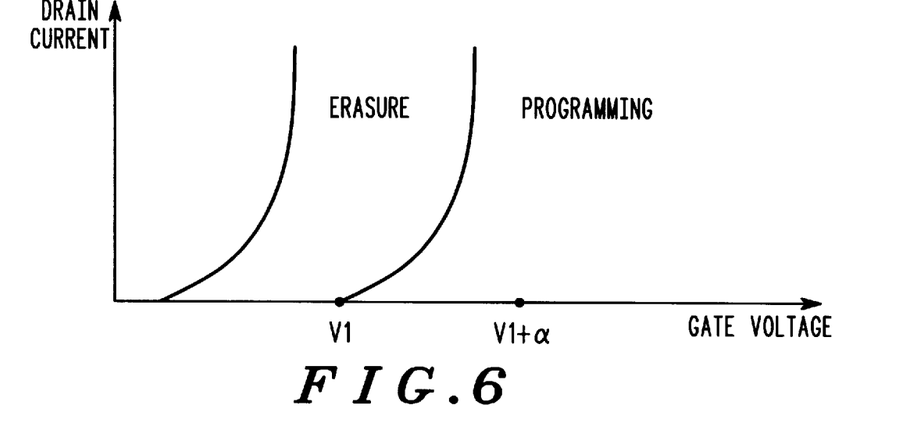
FIG. 6 is a characteristic diagram illustrating current vs. voltage characteristics for a transistor in the EPROM.

FIG. 6 illustrates the relationship between gate voltage and drain current for the transistor 10, where after the charge on the floating gate is lost due to ultraviolet irradiation, a current flows even when the gate voltage is low; however, during programming, that is, after a high voltage is applied to the gate, no current flows unless the gate voltage is increased. In FIG. 6, an electrical transition is from left to right, but not from right to left. In other words, once the threshold value of the transistor becomes high, it will not drop below that. Thus, once security is set using the EPROM, it cannot be normally reset or cleared.

However, if a voltage that is higher than the high voltage applied to the gate during programming ("V1+a" in FIG. 6) is applied to the gate, current flows through the transistor, and the read result for the security bit data is seemingly "0", thus resulting in a security-reset condition.

Figure 7:
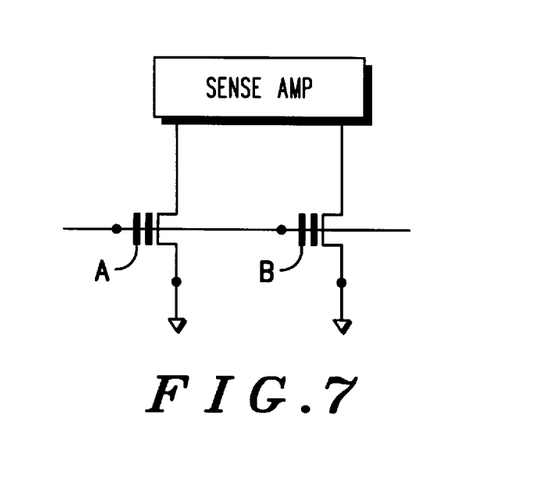
FIG. 7 is a circuit diagram depicting another comparative example for setting the security.
Figure 8:
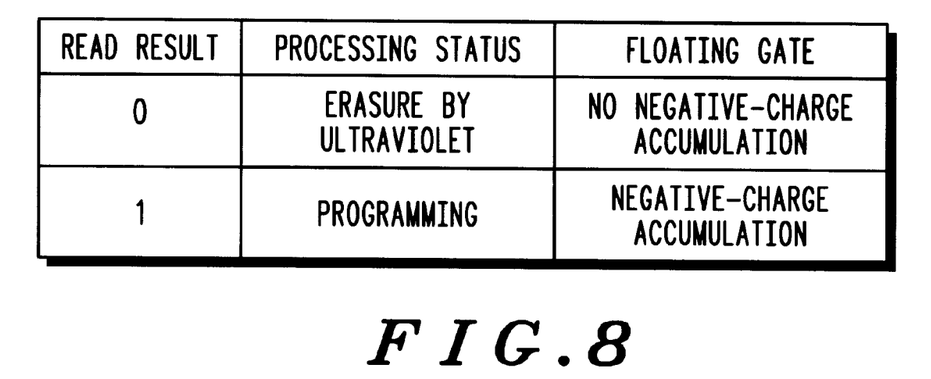
FIG. 8 is an explanatory diagram for defining the correspondence between the results read from the auxiliary memory and the processing status.

Thus, an attempt to use two transistors that comprise memory cells of the EPROM to provide 2-bit security bit data was examined, as shown in FIG. 7. It is assumed here that the results of a read from the memory cell are defined as shown in FIG. 8. That is, the result of a read from the memory cell by the CPU is "0" under conditions where a negative charge on the floating gate of that memory cell is reduced to zero by irradiating ultraviolet rays onto the EPROM, while the result of a read by the CPU is "1" under conditions where a negative charge is stored on the floating gate by programming the memory cell (i.e., applying a high voltage to the gate).

Figure 9:
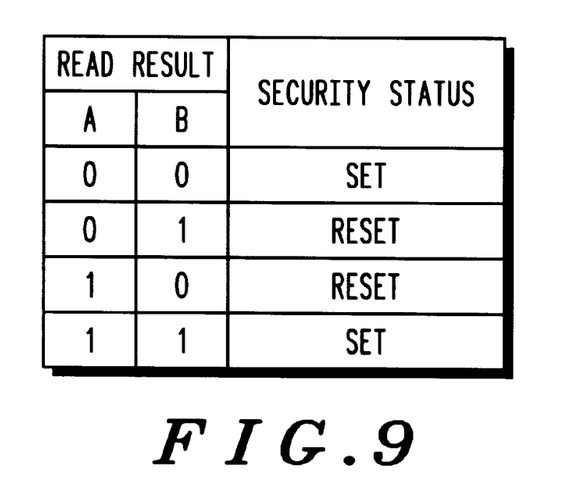
FIG. 9 is an explanatory diagram illustrating the correspondence between the read results and security status when 2-bit security bit data is used.

Assuming that the two transistors shown in FIG. 7 are A and B, then the relationship between security bit data read from the transistors A and B and security status is set as shown in FIG. 9. In this case, if security is set when A=1 and B=1 (meaning that the bit data read from transistor A (B) is 1), then the user writes certain programs and data into a main memory, or ROM, when A=0 (1) and B=1 (0), and subsequently sets A=1 and B=1. If so, the EPROM will not electrically shift from "1" to "0" as described with reference to FIG. 6, so that a third party cannot set A=0 (1) and B=1 (0).

Here, if a memory array that comprises an EPROM as a main memory for storing data such as programs is used and the security bit data is loaded into this memory array, then the programs themselves are lost even if the security may be reset by setting A=0 and B=0 through ultraviolet irradiation, so that they cannot be read out.

However, by applying a higher voltage (V1+a) to the gate as described above, the CPU is allowed to recognize A=0 and B=0 without erasing the contents stored in the main memory. Thus, the case of A=0 and B=0 must correspond to the security-set status; however, this means that the state of A=0 and B=0 remains unchanged even when a chip manufacturer irradiates ultraviolet rays onto the EPROM for shipment to users, so it is in a security-set status.

Thus, the issue is how to reset or clear this security after the chip is shipped to an authorized user. Several methods for resetting the security are conceivable, such as entering a password, and externally applying a predetermined logic signal or voltage to a particular pin of the chip. However, the very idea of writing the security bit data into the EPROM is to be avoided since such approaches for entering the password or inputting the signal to the pin pose problems as described above, so the use of an EPROM itself is less meaningful.

SUMMARY OF THE INVENTION

Accordingly, it is an objective of the present invention to provide a data processing device that offers enhanced memory protection and security maintenance for data (memory contents, such as programs and management information) stored in a memory that comprises a nonvolatile memory.

The present invention encompasses a data processing device, comprising:

a main memory comprising a non-volatile memory for storing data;

an auxiliary memory comprising a programmable ROM for storing bit data to control a read from and a write to the main memory; and a processing portion for executing a read from and a write to the main memory and auxiliary memory, wherein the bit data corresponds to a high or low level of each threshold value of a gate voltage when source-to-drain portions of two or more transistors become conductive, the transistors comprising memory cells of the programmable ROM, and having their gates connected to a voltage application signal line, wherein the processing portion is implemented to perform the following processes a through c in accordance with a combination of bit data read from the auxiliary memory, on the assumption that the bit data read is defined to be "0" when a current flows between the drain and source of the transistor, and "1" when the current does not flow:

a. if each of the bit data is all "0", a write to the auxiliary memory is permitted, while an external write to and read from the main memory is prohibited;

b. if each of the bit data is all "0", a write to the auxiliary memory is prohibited, while an external write to and read from the main memory is prohibited; and c. for at least one combination of bit data having both "1" and "0", a write to the auxiliary memory is permitted, while an external write to and read from the main memory is also permitted.

Programmable ROMs include an EPROM, EEPROM, and flash memory. Prohibiting or disabling an external write and read to and from the main memory means that in a single-chip microcontroller, for example, access from outside the chip to the main memory is denied.

The meaning of the afore-described paragraph "c" is that only if the bit data read is any combination having both "1" and "0", a write to the auxiliary memory is permitted, while an external write to and read from the main memory may be permitted (that is, security may be reset); alternatively, security is reset for some combination, but security may be set for other combinations.

To set security after the user has loaded a program into the single-chip microcontroller, a combination of all "1" bit data in the auxiliary memory may be used, or any combination having both "1" and "0" may be used if security can be set. In the latter case, however, it is necessary that bits shifting from "1" to "0" be contained when the bit data having the security set is shifted to bit data having the security reset. Because of the characteristics of a programmable ROM, each memory cell cannot be individually shifted from "1" to "0", and, with this point in mind, a third party is prevented from generating bit data that may reset security. So configured, it is difficult for any third party to clear the security.

The main memory may also be comprised of a programmable ROM similar to that of the auxiliary memory, and configured so that when the contents of the auxiliary memory are erased, the contents of the main memory are also erased simultaneously. In this case, the main memory is comprised of an EPROM, for example, and the auxiliary memory is built into its memory array.

DETAILED DESCRIPTION OF THE INVENTION

A data processing device according to the present invention is described with reference to an embodiment that employs a single-chip microcontroller unit (MCU). This embodiment incorporates further refinement into the approach for setting security with 2-bit security bit data as described set forth, so that when a combination of security bit data is "0" and "0" with ultraviolet irradiation to the EPROM, a write to an auxiliary memory (security circuit) is enabled.

Figure 1:
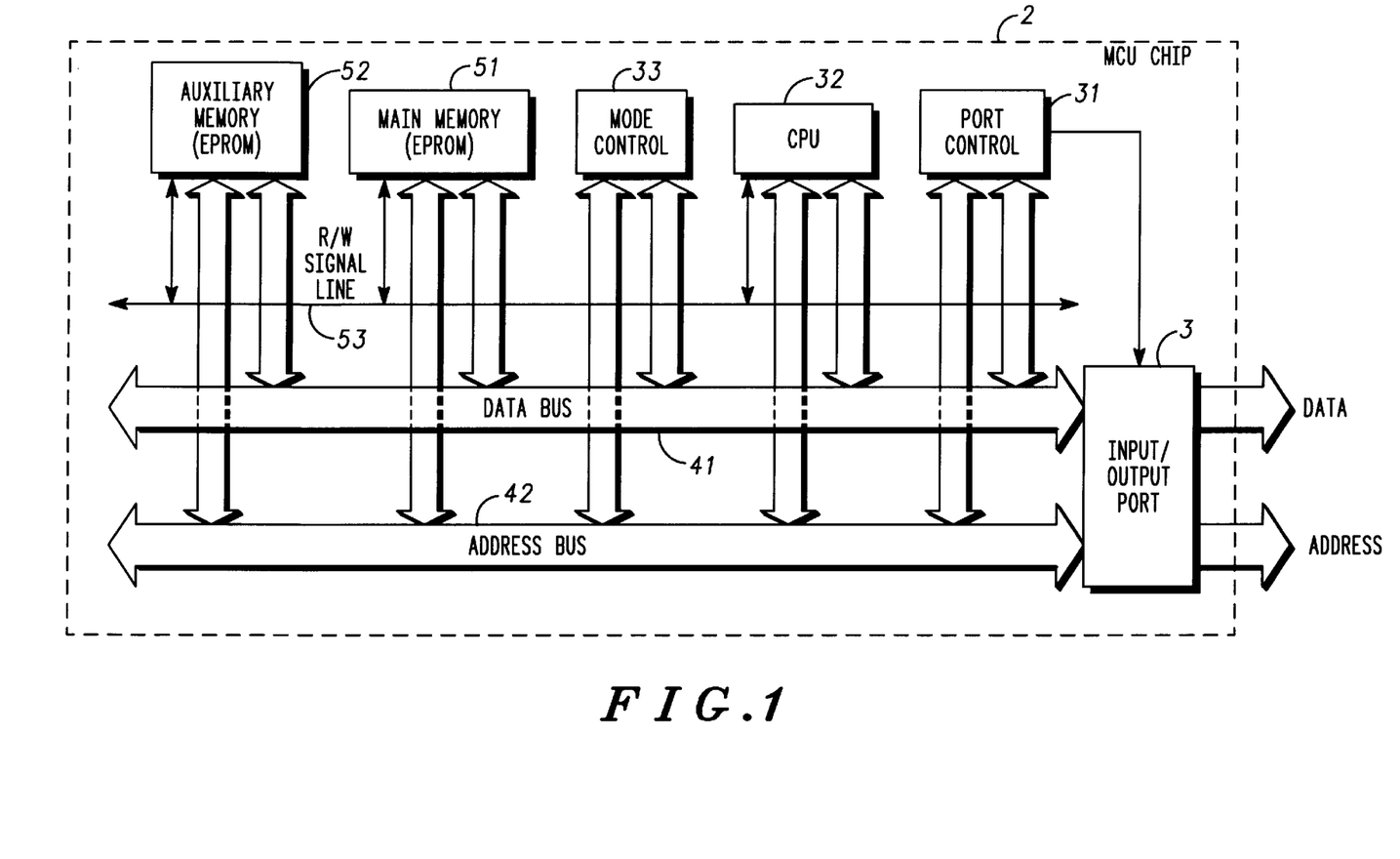
FIG. 1 is a schematic view illustrating the overall configuration of a data processing device according to an embodiment of the present invention.

FIG. 1 is a block diagram illustrating a principal configuration of a data processing device, where a box enclosed by alternate long and short dotted lines denotes a MCU chip 2. The chip 2 has an input/output port 3 for externally transferring signals, which is connected to a data bus 41 and an address bus 42. Referring to components provided in the chip 2, a port control portion 31 controls the input/output port 3 so that it disables any external connection to the data and address buses 41 and 42 when external access is prohibited. It should be noted, however, that signals, such as control signals, may be passed over signal lines (not shown) via the input/output port 3.

A CPU 32 performs main processes within the chip; for example, it accesses a main memory 51 for calculation, or reads bit data from an auxiliary memory 52 to send the result to the port control portion 31. A mode control portion 33 overwrites the bit data in the auxiliary memory 52 in accordance with an external input, such as, for example, a keyboard input or a combination of signals to the pins, thereby selecting either of security set mode or security reset mode. It should be appreciated that although the port control portion 31 and mode control portion 33 are shown and described separately as blocks for convenience of explanation, they are actually contained in the functions of the CPU 32 in the present embodiment.

The main memory 51, which stores data, such as, for example, game software and management information, is comprised of an EPROM, for example. The auxiliary memory 52, which stores security bit data, is comprised of an EPROM, for example. The auxiliary memory 52 is shown and described separately from the main memory 51 for convenience of explanation, but in the present embodiment, it is actually built into a memory array that comprises the main memory 51, so that ultraviolet irradiation through a window of the chip causes its contents to be erased simultaneously with the contents of the main memory 51.

Figure 2:
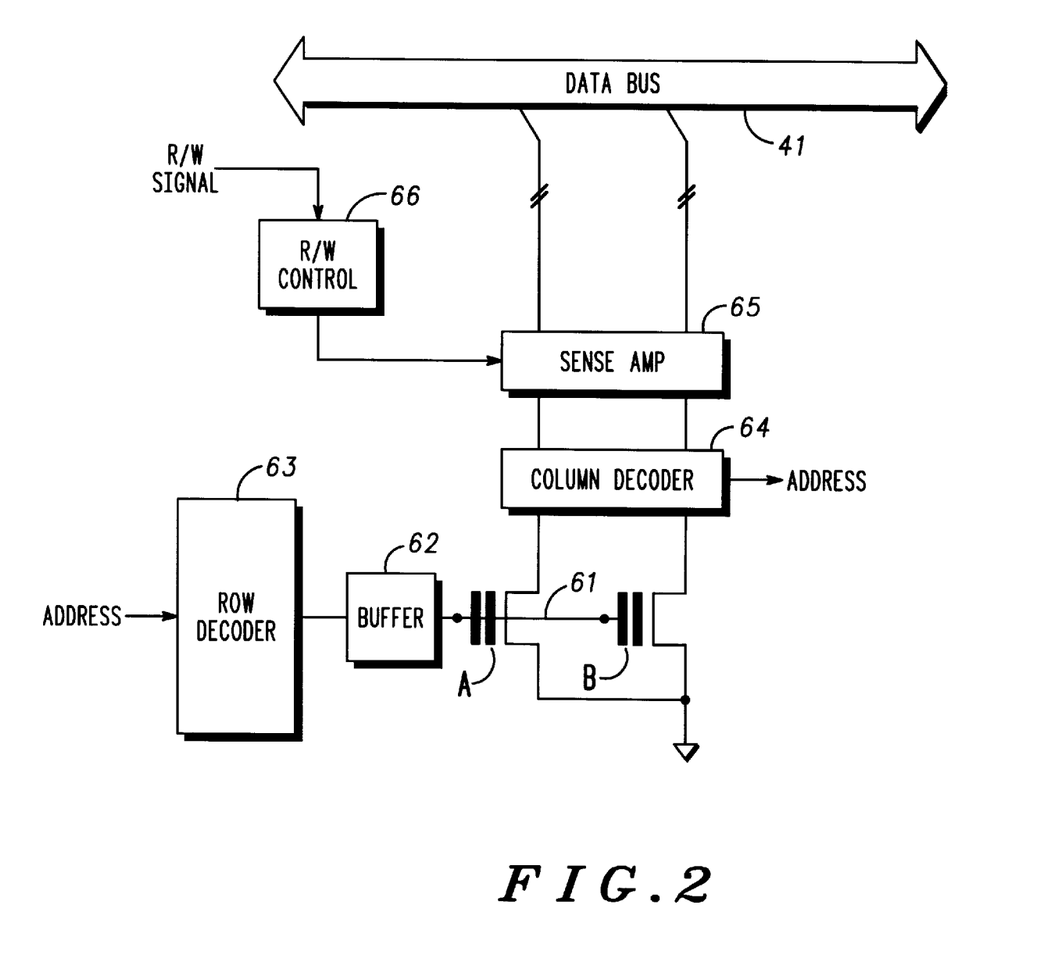
FIG. 2 is a circuit diagram illustrating an auxiliary memory used in the embodiment of the present invention.

It should be appreciated, however, that the auxiliary memory 52 may be provided separately from the memory array of the main memory 51. Reference numeral 53 denotes a read/write (R/W) signal line, which is intended to output a signal from the CPU 32 for controlling a read/write to and from the main memory 51 and auxiliary memory 52. The auxiliary memory 52 is part of the EPROM and is configured as shown in FIG. 2. It is a portion of a typical EPROM memory array and does not include any special configuration. Reference symbols "A" and "B" denote transistors that form memory cells, respectively, with their gates connected to a common voltage signal line 61. The voltage signal line 61 is connected to a row decoder 63 via a buffer 62. The buffer 62 is intended to apply a voltage of, say, 10–15V to the voltage signal line 61 during a write, and apply a voltage of, say, 5V to the voltage signal line 61 during a read.

Drains of the transistors "A" and "B" are connected to a data bus 41 via a column decoder 64 and a sense amplifier 65. A R/W control portion 66 controls a switch portion contained in the sense amplifier 65 in response to a R/W signal from the R/W signal line 53, so that the signal from the data bus 41 is written into the transistors "A" and "B", while the data in the transistors "A" and "B" (operating status of the transistors) is read out onto the data bus 41. The transistors "A" and "B" are intended to store security bit data, so that when a current flows between the drain and source upon application of a read voltage to the gate, a logic "0" appears on a signal line corresponding to the data bus 41, while a logic "1" appears on a signal line corresponding to the data bus 41 when no current flows between the drain and source.

Now, the function related to security in the CPU 32 is described. It is assumed here that when the results read by the CPU 32 from the transistors "A" and "B" of the auxiliary memory 52 are "0" and "0", they are described as A=0 and B=0. Programming is then implemented so that, with A=0 and B=0, an external write to and read from the main memory 51 is prohibited, while an external write to the auxiliary memory 52 is enabled. More specifically, external connection to the data bus 41 and address bus 42 is disabled in the input/output port 3, but only the auxiliary memory 52 can be externally accessed through the mode control portion 33 over a signal line (not shown), so that a write signal is input to the R/W control portion 66.

With A=1 and B=1, an external write to and read from the main memory 51 is prohibited, while a write signal is not provided to the R/W control portion 66, thereby also disabling a write to the auxiliary memory 52. Furthermore, with (A=1 and B=0) or (A=0 and B=1), the restriction imposed on the input/output portion 3 as described above is lifted to permit an external write to and read from the main memory 51 and also permit a write to the auxiliary memory 52.

Figure 3:
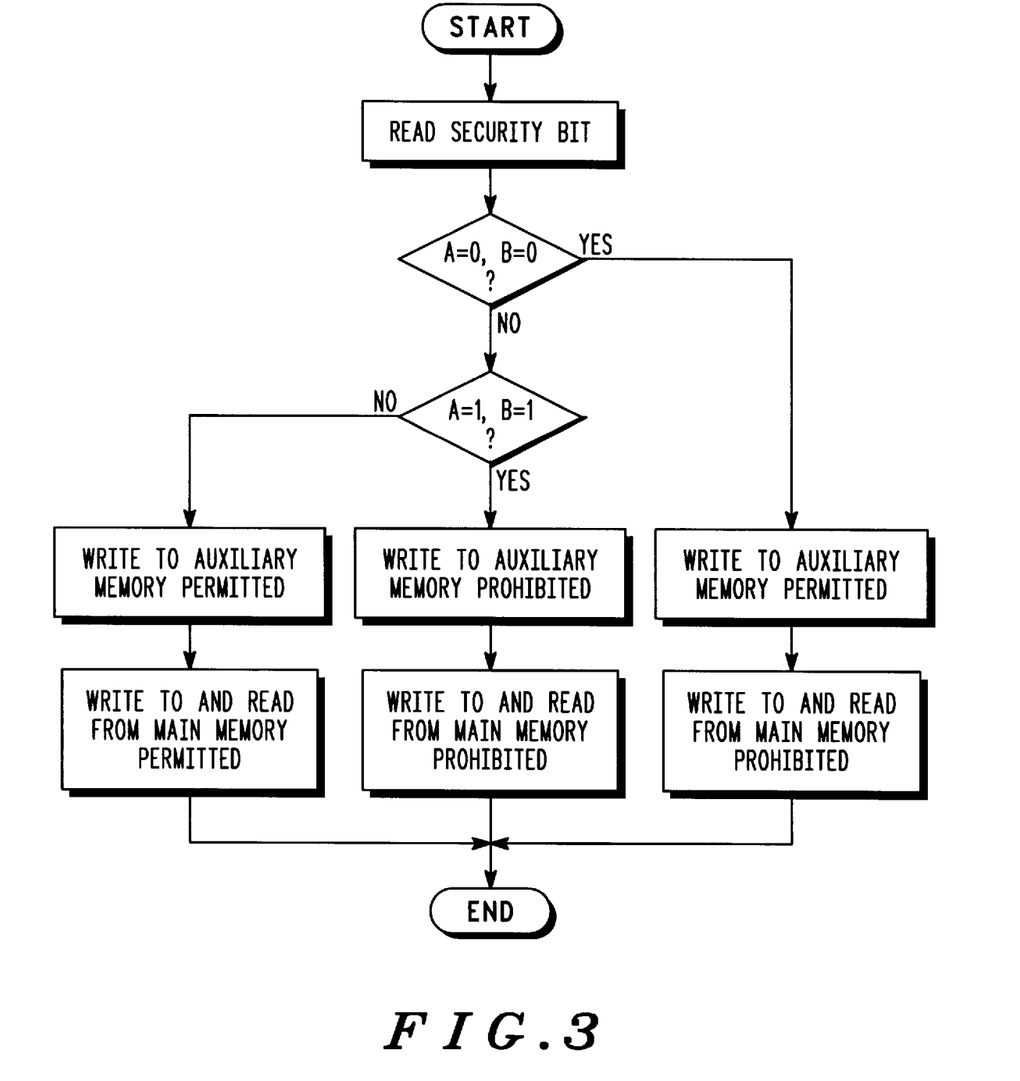
FIG. 3 is a flowchart depicting the process flow according to the embodiment of the present invention.

Thus, when the CPU 32 is externally activated, its flow is as shown in FIG. 3. This flow conceptually represents the function of the CPU 32, where security bit data is first read from the auxiliary memory 52 and decoded. For example, if A=0 and B=0, then a write to the auxiliary memory 52 is enabled, and unless that write is executed, the main memory 51 cannot be accessed externally. In this case, if A=1 and B=0 are written to the auxiliary memory 52, the flow proceeds to A=1 and B=0, so that security is cleared.

Figure 4:
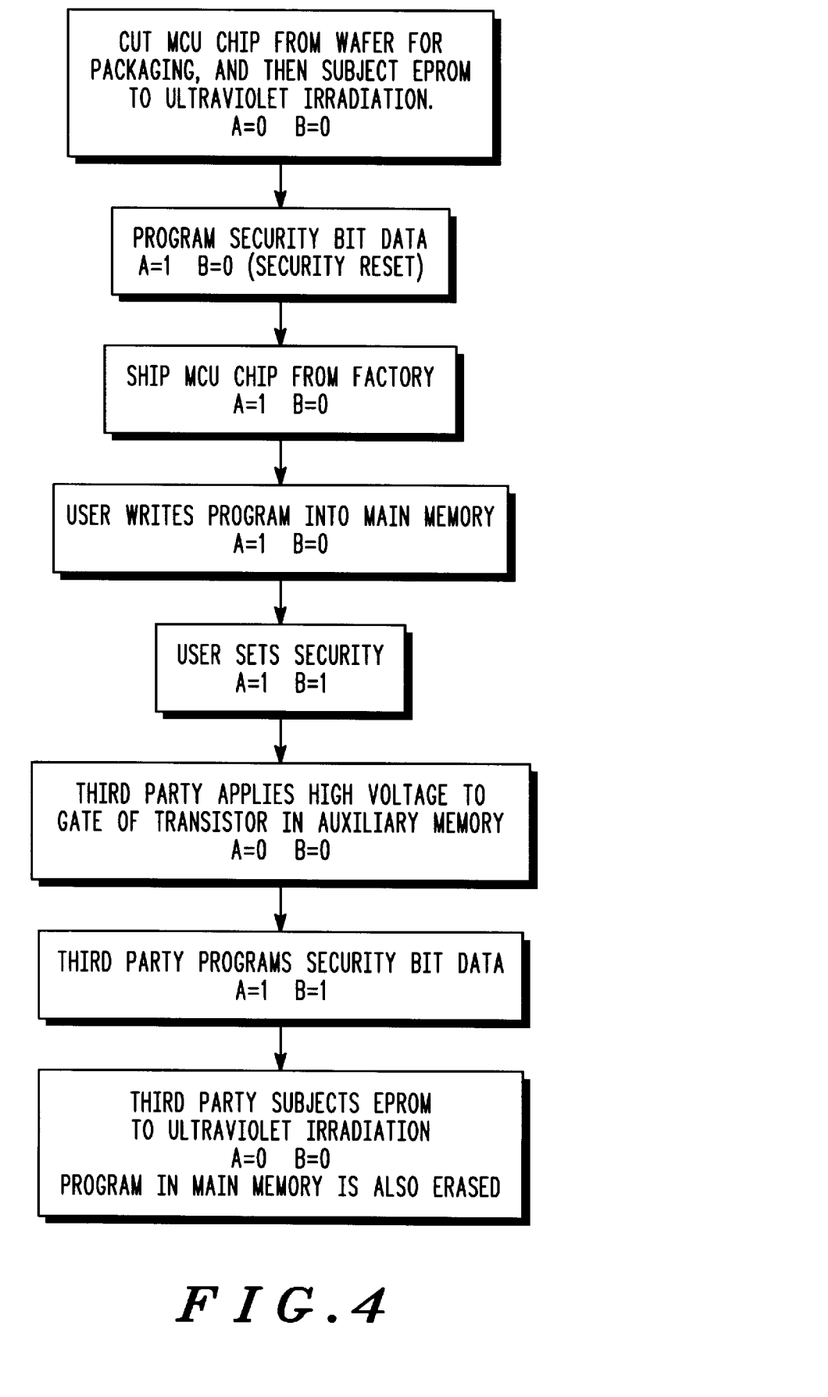
FIG. 4 is an explanatory diagram depicting a relationship between security bit data and device status, from the manufacture of the data processing device to an attempt by a third party to read the program.

FIG. 4 illustrates a flow sequence where, for example, a single-chip MCU is cut from a semiconductor wafer and is shipped to a user, who incorporates this MCU into a system which is then put on the market. First, a manufacturer packages the MCU chip cut from the wafer and irradiates ultraviolet rays onto the EPROM. Since the main memory 51 and auxiliary memory 52 are built into the EPROM memory array, their contents are all "0"(in a state where the threshold value of the transistor gate voltage is low). In this state, A=0 and B=0, so security is set; however, since a write to the auxiliary memory 52 is enabled, security is reset with A=1 and B=0, and then the MCU chip is shipped to the user.

The user writes a predetermined program into the main memory 51 of the MCU chip and then sets security with A=1 and B=1. Let us assume here that a third party gets this MCU chip, and applies a high voltage to the gates of the transistors A and B of the auxiliary memory 52 in an attempt to clear the security in order to read the program from the main memory 51; as a result, the security bit data is now seemingly A=0 and B=0. Then, because an external write to the auxiliary memory 52 is enabled, the third party may try to execute such a write; however, since the high voltage has already been applied to the gates of the transistors A and B, with negative charge stored on the floating gate, both A and B cannot assume but "1", thus resulting in A=1 and B=1. This means a security-set status, so that the security cannot be cleared after all.

Now, if the third party irradiates ultraviolet rays onto the EPROM for A=0 and B=0, then A=1 and B=0 (or A=0 and B=1) may be written, so that the security is reset; however, since this also causes the contents of the main memory 51 to be erased, the third party cannot achieve its original goal after all. Therefore, according to the present embodiment, protection of the memory contents and maintenance of security can be accomplished. Additionally, security can be set during chip fabrication without using a password, etc., and thus the need for a so-called "secret key" is eliminated, thereby offering a significant security benefit in this regard as well.

In the embodiment described above, only security bit data of A=0 and B=1 may clear security, while security bit data of A=1 and B=0 may set security. In this case, the user may set security with A=1 and B=0, instead of A=1 and B=1. If security is set with A=1 and B=0, a combination of A=0 and B=1 cannot be created even after a third party applies a high voltage to the gates of the transistors A and B for, seemingly, A=0 and B=0, so that a similar benefit is achieved.

In the present invention, three or more security bits of data may be used. If a transistor C is present besides the transistors A and B, for example, in the auxiliary memory 52, then security is set with A=0, B=0, and C=0, but a write to the auxiliary memory 52 is permitted; with A=1, B=1, and C=1, a write to the auxiliary memory 52 is also prohibited. For other combinations, that is, combinations containing both "0" and "1", if security is reset with at least one combination among them, then a similar benefit is achieved.

It should be appreciated, however, that if the security bit data that is set in the auxiliary memory 52 is A=1, B=1, and C=1, then combinations containing both "0" and "1" cannot be created; however, if the security bit data that is set in the auxiliary memory 52 is a combination containing both "0" and "1", then the security bit data that resets the security needs to contain a combination that will not shift electrically. For example, if security is set with A=0, B=0, and C=1, then a combination of A=0, B=1, and C=1 cannot be used as bit data that resets the security, since a combination of A=0, B=1, and C=1 can be created by shifting B from "0" to "1" (this shift can be done electrically); however, a combination of A=1, B=1, and C=0 cannot be created because C must be shifted from "1" to "0" (this shift cannot be done electrically), so that this combination can be used as bit data that resets the security. It should be appreciated that increasing security bits of data will reduce the possibility that bit data that resets the security may be created accidentally by introducing noise externally.

Thus, the present invention may be employed not only to prevent read-out or destruction of game software and other data by any third party, but also to prevent a test program that is run by the manufacturer for shipment testing (functional testing) form being activated by the user. That is, if the user activates the test program that is run prior to shipment, the chip sometimes become useless, so it is desirable for the purpose of chip protection that the user is disallowed to access this test program. Thus, according to the embodiment described above, if the manufacturer sets the bit data in the auxiliary memory 52 to A=0 (1) and B=1 (0), runs the test program in the main memory to perform certain shipment tests, and subsequently sets A=1 and B=1 before shipment, then the possibility that the user may accidentally activates the test program is eliminated.

As described above, the present invention offers an advantage of enhanced memory protection and security for the data stored in the main memory.

What is claimed is:

1. A data processing device, comprising:

a main memory comprising a non-volatile memory for storing data;

an auxiliary memory comprising a programmable ROM for storing bit data to control a read from and a write to the main memory, wherein the bit data corresponds to a high or low level of each gate threshold voltage in conductive state of transistors, the transistors comprising memory cells of the programmable ROM, and having their gates connected to a voltage application signal line, wherein the bit data read being "0" when a current flows between the drain and source of the transistor, and "1" when the current does not flow; and a processing portion for executing a read from and a write to the main memory and the auxiliary memory, wherein the processing portion is implemented to perform in accordance with a combination of bit data read from the auxiliary memory the following:

(a) if each of the bit data is all "0", a write to the auxiliary memory is permitted, while an external write to and read from the main memory is prohibited;

(b) if each of the bit data is all "1", a write to the auxiliary memory is prohibited, while an external write to and read from the main memory is prohibited; and (c) for at least one combination of bit data having "1" and "0", a write to the auxiliary memory is permitted, while an external write to and read from the main memory is also permitted.

2. The data processing device according to claim 1, wherein the main memory is comprised of a programmable ROM similar to that of the auxiliary memory, and the contents of the main memory are erased when the contents of the auxiliary memory are erased.

3. The data processing device according to claim 2, wherein the auxiliary memory is built into a memory array that comprises the main memory.

* * * * *